United States Patent Office 3,233,102
Patented Feb. 1, 1966

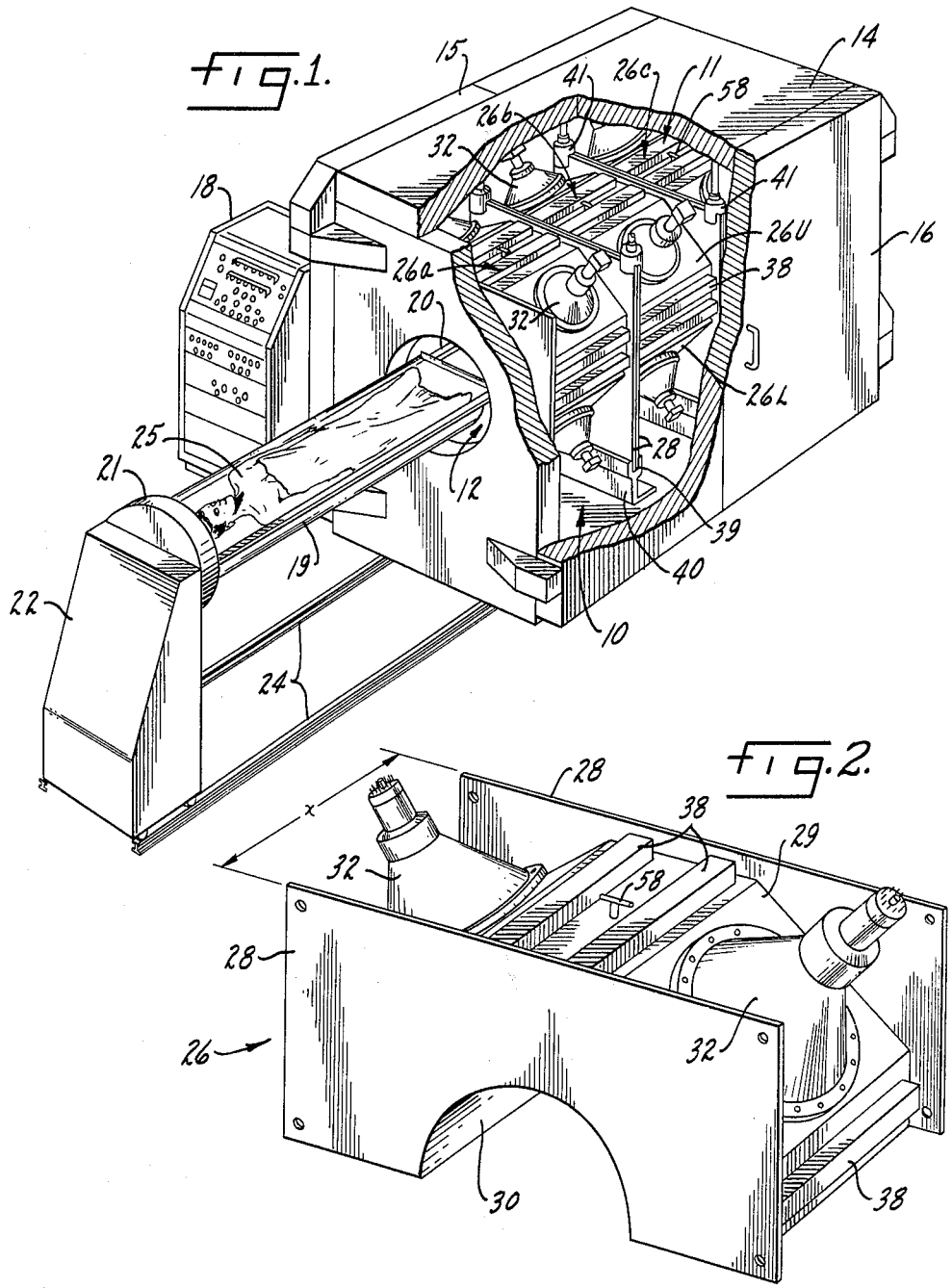
Feb. 1, 1966    L. E. PACKARD    3,233,102
APPARATUS RELATING TO THE DETECTION AND MEASUREMENT
OF RADIOACTIVITY IN RELATIVELY LARGE BODIES
Filed July 27, 1962    3 Sheets-Sheet 1
INVENTOR.
Lyle E. Packard,

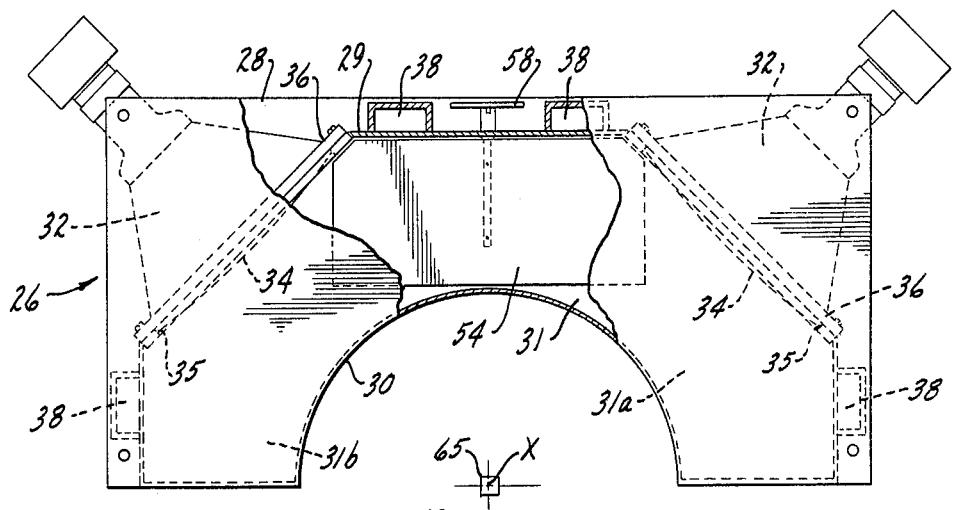
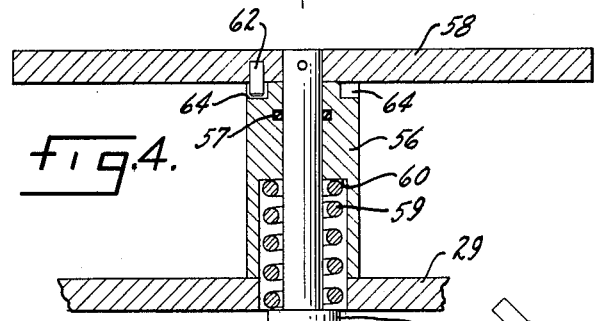
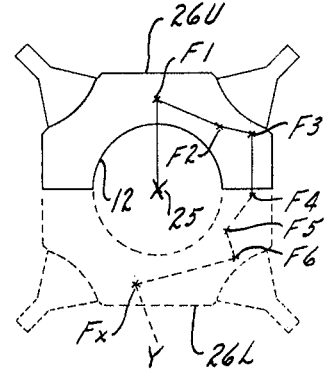

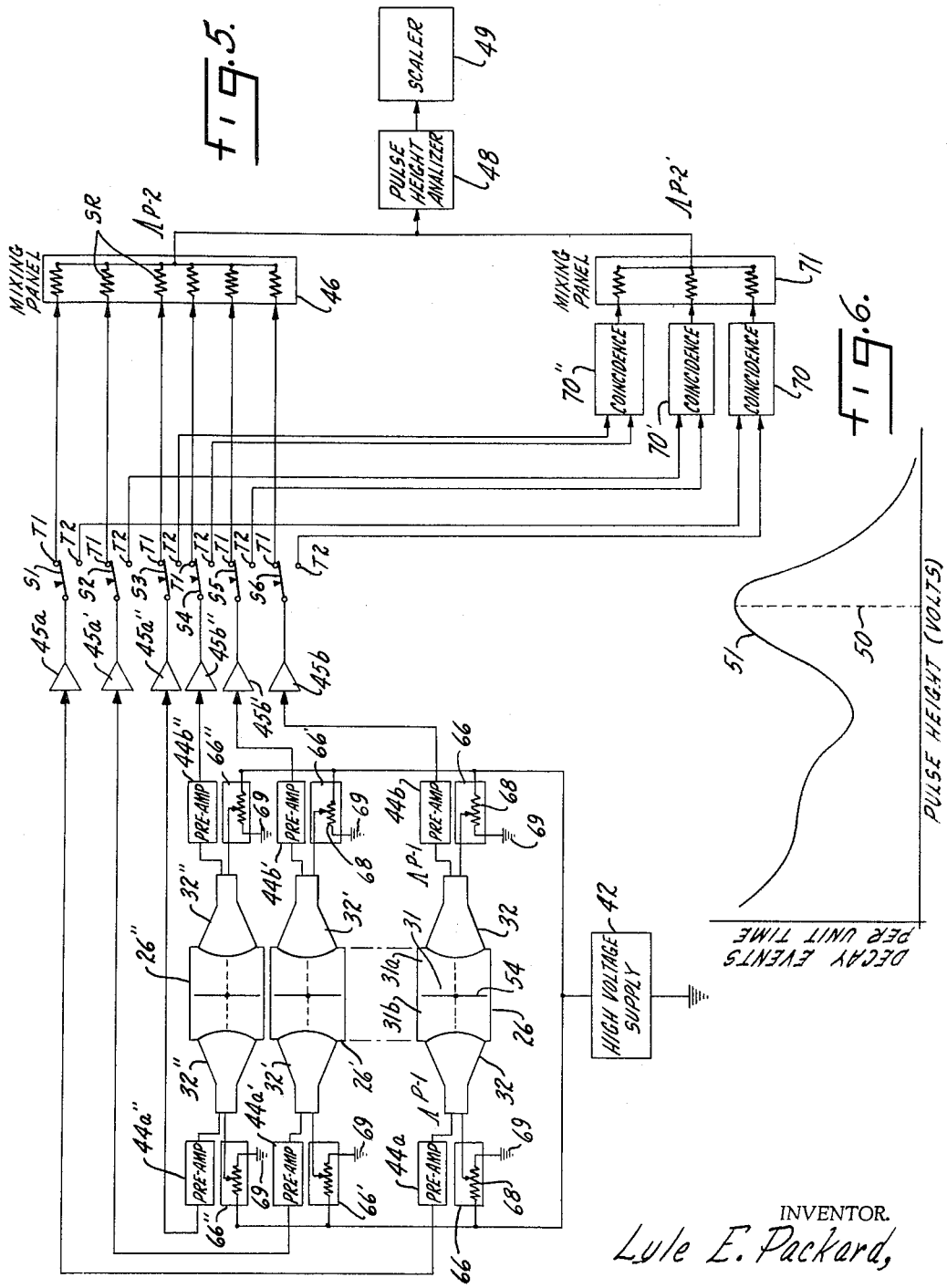

3,233,102
APPARATUS RELATING TO THE DETECTION AND MEASUREMENT OF RADIOACTIVITY IN RELATIVELY LARGE BODIES
Lyle E. Packard, 323 N. Quincy, Hinsdale, Ill.
Filed July 27, 1962, Ser. No. 212,948
18 Claims. (Cl. 250—71.5)

The present invention relates in general to apparatus for detecting and measuring radiations emanating from a relatively large body and, more particularly, to liquid scintillation spectrometry apparatus for detecting and measuring the energy spectra of radioactive isotopes present in large bodies, and apparatus for balancing the diverse light transducers employed with such spectrometry apparatus. While not so limited in its application, the invention will find particularly advantageous use in detecting and measuring gamma radiations emanating from either human bodies or from the bodies of animals, and which may range in size from small to relatively large bodies.

The detection and measurement of radiations emanating from large bodies, for example, human bodies or the bodies of animals, has heretofore given rise to many problems which have made "whole body counters" not only inefficient, but also extremely costly. Such counters must be quite large to accommodate the test subjects whose radioactivity levels are to be counted. Merely by way of example, such counters generally have an axial length which may exceed six feet when they are used to detect and measure radiations emanating from the body of an adult human, and when the test body is that of a large animal, the counting chamber may have to be even larger. Moreover, in order to detect and measure, with high efficiency and good spectral resolution, radiations emanating from such bodies, it is desirable that the liquid scintillation medium employed surround or substantially surround the body. Because of their large size and the quantity of liquid scintillation medium that is required, whole body counters are extremely heavy and costly. Often, the cost is prohibitive for small test facilities having a limited source of capital.

Heretofore, whole body counters have taken the form of relatively large annular tanks defining an internal counting chamber into which the subject to be tested is placed. On occasion, the detector tank has been something less than annular, as for example, a chamber having a semi-annular horizontal cross-section defining a semi-cylindrical counting chamber in which the subject to be counted may lie or stand. In either case, the liquid scintillation medium has been contained within a relatively long annular or semi-annular tank having a single liquid compartment. The single body of liquid scintillating solution contained in the tank has been viewed by a plurality of closely spaced photomultipliers which are mounted in the outer wall of the tank. Should one of the photomultipliers break, an appreciable amount of the relatively costly scintillating medium (which, for example, may cost in the neighborhood of $10.00 per gallon) is lost; and if the broken photomultiplier is at the bottom of the tank, all of the scintillating medium may be lost. And, of course, should any portion of the interior of the tank or its contents become contaminated, all of the scintillating medium may have to be disposed of and replaced.

Another problem encountered by the users of prior large whole body counters is that of properly balancing the response characteristics or gains of various photomultipliers being used so that each will produce an identical output signal spectrum when subjected to the same energy spectrum of radioactive decay events occurring in the test body. Since all of the photomultipliers did not view precisely the same shape and volume of scintillating medium (some photomultipliers being, for example, closer to the end walls of the tank than others), it was virtually impossible to accurately balance the photomultipliers in situ. Thus, in prior arrangements the photomultipliers had to be removed, balanced one by one in a test stand, and reinstalled. Such a procedure is not only time consuming, but is also unsatisfactory since more often than not, when the unit is reassembled the photomultipliers will again be balanced. Attempts have been made to adjust each of the photomultipliers in situ until the cumulative output spectrum of all of the photomultipliers is optimized, but this type of adjustment has not proven either accurate or satisfactory.

It is a general aim of the present invention to provide an improved whole body counter which overcomes the foregoing disadvantages and which is characterized by its ease of manufacture, shipping and installation, and its versatility in operation.

It is a more specific object of the invention to provide a modular whole body counter comprising a plurality of tank-like detector modules which may be readily assembled by the user into a counting chamber having a geometric configuration most suitable for the particular needs of the user.

A related object of the invention is to provide a whole body counter which may be readily expanded by the simple expedient of adding additional modules, and wherein all of the components of the initial counter may be used in the expanded counter. In this connection, it is an object of the invention to provide detector modules which may be mounted in end-to-end relation to form a counting chamber having a desired axial length or depth, and which may also be mounted in face-to-face relation to form a counting chamber having a desired geometrical configuration, such, for example, as a $2\pi$ or $4\pi$ counter.

A correlative object of the invention is to provide an elongate modular whole body counter suitable for use in detecting and measuring radioactivity levels in relatively long bodies, yet wherein certain selected detector modules may be disabled when shorter bodies are being counted, thereby decreasing background noise.

Still another object of the invention is to provide a novel whole body counter made up of a plurality of detector modules each of which defines a separate liquid-tight chamber for containing the liquid scintillation medium employed with such counters. Since the overall whole body counter is made up of a plurality of separate liquid-tight compartments, contamination of one tank or breakage of one photomultiplier will not result in the loss of all or most of the scintillation medium. On the contrary, only a fractional part of the total amount of scintillation liquid need be replaced, thus providing a material saving in time, labor, and cost.

In another of its important aspects, it is an object of the invention to provide novel apparatus for accurately balancing, in situ, the light transducers employed with whole body counters. As a conquence of attaining the foregoing objective, the elapsed time heretofore required for balancing the light transducers is materially reduced, while at the same time the balancing accuracy and the resolution of the pulse spectrum are materially enhanced.

It is a more detailed object of the invention to provide a whole body counter in which the tank or tanks of liquid scintillation medium may be readily compartmented to form a plurality of compartments of substantially identical size and shape each viewed by a single photomultiplier, thus permitting accurate balancing of the individual photomultipliers.

Still another object of the invention is to provide a modular whole body counter in which each detector module is viewed by a plurality of light transducers whose outputs may be selectively channeled through either a coincidence network or to a signal totalizer, thus increasing the versatility of the counter.

Other objects and advantages of the invention will become apparent as the following description proceeds, taken in conjunction with the accompanying drawings, in which:

FIGURE 1 is a perspective view of a modular whole body counter embodying the features of the present invention with a portion of the shielding cut-away to illustrate the tank-like detector modules and manner of support thereof;

FIG. 2 is a perspective view of an exemplary liquid scintillating detector module of the type used in the counter shown in FIG. 1;

FIG. 3 is a side elevation, partly in section, of the detector module shown in FIG. 2;

FIG. 4 is an enlarged fragmentary sectional view illustrating the details of the baffle positioning mechanism;

FIG. 5 is a diagrammatic block-and-line representation of a whole body scintillation counter embodying the features of the present invention;

FIG. 6 is a graphic representation depicting by a broken line an ideal energy spectrum for a typical mono-energetic radioactive isotope and, also illustrating by a solid line the output pulse height spectrum actually obtained from a typical light transducer sensitive to light scintillations produced by a mono-energetic isotope;

FIG. 7 is a diagrammatic view illustrating particularly the randomly spaced light scintillations produced by a single decay event together with the importance of maximizing counting geometry; and FIG. 8 is a graphic representation similar to FIG. 6 of the output pulse spectra of a plurality of light transducers which have not been properly balanced.

While the invention is susceptible of various modifications and alternative forms, a specific embodiment thereof has been shown by way of example in the drawings and will therein be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

Referring now to the drawings, there is illustrated in FIG. 1, a whole body counter, generally indicated at 10, here shown in conjunction with a tank and detector assembly 11 for containing a liquid scintillation medium in substantially surrounding relationship to a centrally disposed counting chamber 12. In the exemplary from of the invention, the tank assembly 11 is mounted within a shield 14 which may, for example, take the form of a housing having iron walls approximately eight inches thick for the purpose of inhibiting counting errors due to cosmic radiation and certain other spurious background noises. The housing or shield 14 is provided with hinged doors 15, 16 on opposite sides thereof to permit ready access to the tank and detector assembly 11 for installation and other servicing functions. A suitable console 18 is positioned adjacent to and exterior to the housing 14, the console containing amplifiers, pulse height analyzers, and counters electrically coupled to the detecting equipment used with the tank and detector assembly 11.

For the purpose of introducing a test subject into the counting chamber 12, one end of a slight assembly 19 is slidably mounted on a pair of spaced tracks 20 (one such track being visible in FIG. 1), which are rigidly mounted on opposite sides of the counting chamber 12. The opposite end of the sling assembly 19 is supported on the counting chamber door 21, the latter being mounted on a movable support 22. The support 22 is slidably mounted on a pair of spaced tracks 24 for relative axial movement towards and away from the counting chamber 12. The arrangement is such that when the support 22 is moved axially away from the counting chamber 12 and housing 14 to the position shown in FIG. 1, the sling assembly 19 is withdrawn from the counting chamber. When a test body, for example, a human body 25, is positioned in the sling assembly 19, the support 22 is then moved axially towards the housing 14 along the tracks 24, thus positioning the body 25 centrally within the counting chamber 12 with the door 21 totally closing the latter. It will be apparent that the tracks 20 and sling assembly 19 can be readily positioned with respect to the wall of the counting chamber 12 and door 21 respectively so as to insure that the object to be counted (e.g. the body 25) is disposed substantially along the axis of the counting chamber.

In accordance with one of tthe important aspects of the present invention, the tank and detector assembly 11 is made up of a plurality of separate detector modules each defining a liquid-tight chamber for containing a liquid scintillation medium and each including light transducer means interposed between the opposite axial end walls of the detector module. In the illustrative form of the invention shown in FIG. 1, the tank and detector assembly 11 includes three pairs of modules 26a–26c arranged to form a counting chamber 12 having $4\pi$ geometry and an axial depth or length equal to three times the axial depth of one modular unit.

An exemplary liquid scintillation detecting module 26 embodying the features of the present invention has been illustrated in FIGS. 2 and 3. As here shown, the module 26 includes a pair of parallel axial end walls 28 which are held in spaced apart relation by a polygonal outer wall 29 and a generally semi-cylindrical inner wall 30, the entire assembly defining an enclosed liquid-tight chamber 31 for containing a liquid scintillation medium. The liquid scintillation medium may comprise any one of numerous commercially obtainable scintillators or fluorescent materials dissolved in a solvent, the scintillation medium being characterized by its ability to convert radiation energy resulting from a decay event (e.g. gamma photons emitted from a gamma emitting tracer introduced into the body 25) into light energy. When employed as a component part of a whole body counter (e.g. the counter 10 shown in FIG. 1), the detector module 26 is mounted in such a manner that the opposed end walls 28 are substantially normal to the axis of the object whose radioactivity level is being measured, and with the inner wall 30 (which constitutes at least a portion of the wall of the counting chamber 12) disposed in proximity to the object. It will be appreciated that while the wall 30 has been shown as semi-cylindrical in configuration, it may take other forms dependent upon the desired shape of the counting chamber 12 and the particular shape of the module 26 itself. For example, if two of the exemplary modules 26 shown in FIGS. 2 and 3 are abutted face-to-face (to form one of the module pairs 26a–26c shown in FIG. 1), the resulting counting chamber 12 defined by the facing walls 30 would be cylindrical. Alternatively, the modules could be so constructed that three or more must be abutted face-to-face to form a chamber having $4\pi$ counting geometry, in which case the wall 30 of each module might simply be arcuate. In certain instances it may be desirable to construct a whole body counter having other than cylindrical or semi-cylindrical counting chambers, and in these cases the wall 30 could be either planar or polygonal, or it could define a portion of a spherical counting chamber.

For the purpose of detecting light scintillations in the scintillation medium resulting from a decay event occurring in the body 25, the chamber 31 which contains the liquid scintillator is viewed by light transducer means disposed in a single plane parallel to and intermediate the axial end walls 28 of the module. Such light transducer means may take the form of photomultiplier tubes 32 which are, in a manner well known in the prior art, characterized by their ability to detect light scintillations and convert the light energy detected into electrical pulses which are, in general, proportional in amplitude to the light energy received from corresponding scintillations. In the exemplary module shown in FIGS. 2 and 3, two such light transducers or photomultipliers 32 are employed, each having its light transmissive end wall 34 received within an associated opening 35 formed in the outer wall 29 of the module 26. The photomultipliers 32 are snugly retained in place by means of clamping rings 36 which are rigidly secured to the outer wall 29. Suitable seals are provided for insuring that the chamber 31 is maintained both liquid-tight and light-tight.

In carrying out the present invention, the detector modules 26 are provided with a plurality of expansion chambers 38 (FIGS. 2 and 3) which are generally box-shaped in construction and which are rigidly secured to the outer surface of the wall 29. The interiors of the chambers 38 are connected with the interior of the chamber 31 by suitable valves and conduits (not shown). The valves may be so arranged that when a given module 26 is being filled with a scintillator solution, the module is slightly overfilled, thus providing an excess of liquid which partially fills one or more of the expansion chambers 38. In the event that changes in temperature cause the liquid scintillator to expand, such expansion or increased volume of liquid is accommodated in the expansion tanks. Conversely, should the liquid contract, the surplus of scintillator in the tanks will insure that the main detecting chamber 31 remains totally filled.

As best illustrated in FIG. 1, a whole body counter 10 may be readily formed from detector modules by the simple expedient of mounting a plurality of such modules in end-to-end relation to form a tank and detector assembly 11 which is elongate in an axial direction, and in face-to-face relation to achieve the desired counnting geometry. As here illustrated, the abutting end walls 28 of a plurality of adjacent lower modules 26L are received within the upwardly facing channels 39 of transverse supporting brackets 40, thereby defining a counting chamber having $2\pi$ counting geometry and an axial length dependent upon the number of lower modules employed (here the counter has a length equal to three times the axial depth $x$ of a single module). To convert the unit to a counter having $4\pi$ counting geometry, it is simply necessary to add a corresponding plurality of upper modules 26U which are mounted in face-to-face relation with respective ones of the lower modules 26L, and which are retained in position by means of hangers 41 suspended from the roof of the housing 14. The hangers 41 are coupled to the end walls 28 of the upper modules. Of course, in the event that it is desired to expand the radiation counter 10 at some time subsequent to initial installation, this may readily be accomplished simply by extending the housing 14 and adding additional modules 26 to form a complete counter having the desired length and counting geometry. Moreover, if the test body 25 is considerably smaller than the counting chamber 12, a selected pair of modules (e.g. the pair 26c) may be disabled or electrically disconnected from the console 18—the body 25 then being positioned centrally of the remaining module pairs (e.g. pairs 26a, 26b). In this manner, the deleterious effects of background noise occurring in the photomultipliers and electrical equipment associated with the unused pair can be eliminated.

Turning now to FIG. 5, a typical counting cycle for the whole body counter 10 will be briefly reviewed, it being assumed for the purpose of the ensuing discussion that all of the light transducers employed are properly balanced so as to produce identical output signal spectra when subjected to gamma radiation having the same energy spectrum.

As shown in FIG. 5, a plurality of liquid scintillation detector modules 26, 26′ and 26″ are coupled to a source of high voltage 42. It will be understood that the particular geometrical disposition of the modules 26-26″ is not critical and they, along with additional modules, may be arranged to form a counting chamber having any desired counting geometry (e.g., a $2\pi$ or a $4\pi$ counting geometry, or any other geometry permissible with the particular shape of the modules being used).

Considering for the moment module 26 (FIG. 5), let it be assumed that a gamma ray emanating from the body 25 (FIG. 1) produces light scintillations in the scintillation medium contained within the module. Such scintillations will be detected by each of the photomultipliers 32, thus producing electrical output signals P–1 which, in general, are proportional in amplitude to the light energy received by the respective photomultipliers. Because the light may travel a greater distance from the point of scintillation to reach one photomultiplier than it travels to reach the other photomultiplier, and because some light attenuation occurs in the liquid, the two pulses P–1 may not be equal in amplitude. In general, however, the sum of the amplitudes of the two pulses P–1 will be proportional to the total amount of light energy produced by the scintillation event.

The signals or pulses P–1 are passed through corresponding linear preamplifiers 44a, 44b and linear amplifiers 45a, 45b directly to a mixing panel 46. Similarly, the output signals from photomultipliers 32′ and 32″, assuming that light scintillations have occurred in the corresponding modules 26′, 26″, are passed through associated preamplifiers 44a′, 44b′, and 44a″, 44b″ and amplifiers 45a′, 45b′ and 45a″, 45b″ to the mixing panel 46. The mixing panel includes a network of summing resistors SR which serve to produce a single output pulse P–2 proportional to the instantaneous sum of all the input signals P–1 to the network. The resulting output pulse P–2 is then fed to a pulse height analyzer 48 characterized by its ability to analyze pulses and pass only those falling within a preselected band or range of pulse heights, all other pulses being blocked. The pulses P–2 falling within the preselected range for which the analyzer 48 is set, are then passed to a scaler 49 or other suitable counting device.

The above description has been based upon the assumption that all of the light transducers used with the whole body counter are accurately balanced. Prior to the present invention, it has been exceedingly difficult, if not virtually impossible, to accurately balance a plurality of light transducers associated with a large tank of liquid scintillation medium, primarily because the individual transducers do not view bodies of liquid having substantially the same geometrical size and shape. The present invention, therefore, is concerned with apparatus for accurately balancing such light transducers. However, before discussing this aspect of the invention, it might be well to consider the type of radioactive energy spectra most often encountered and the factors which affect accurate balancing of light transducers.

The present invention finds a particularly advantageous use in detecting and measuring gamma radiations emitted from a radioactive tracer introduced into a test body (e.g., body 25 in FIG. 1). A gamma emitting isotope is substantially a mono-energetic isotope. That is, in a perfect mono-energetic isotope, all decay events will produce radiations having the same energy. Under idealized circumstances, the light produced by scintillation as a result of each decay event would possess the same number of photons, a linear fraction of this light would reach the photomultipliers, and the resulting composite or "sum" pulse P–2 (FIG. 5) from each decay event would have the same height. Theoretically then, the pulse height spectrum for the pulses P–2 would appear as a vertical line 50 (FIG. 6). In practice however, such a pulse height spectrum is not achieved. In the first place, even if all of the decay events which produce radiations had identical energies, still the number of input light photons to the photomultipliers will vary slightly because of light attenuation within the scintillation medium itself. Moreover, the characteristics of photomultipliers are such that even with input light pulses of uniform strength, the amplitudes of electrical output pulses will vary slightly. As a consequence of these factors, the signal spectrum on the output side of the photomultipliers will be spread, appearing as a spectrum diagrammatically represented by the curve 51 shown in FIG. 6.

It will be observed that the typical spectral curve 51 representative of a mono-energetic isotope comprises a relatively great number of low amplitude pulses, a relatively few intermediate amplitude pulses, and a relatively great number of high amplitude pulses. It is the latter band of pulses (i.e., those which form a spectral peak corresponding to the energy level of the mono-energetic isotope) which the user desires to count and which the pulse height analyzer 48 (FIG. 5) is set to pass. The relatively great number of low amplitude pulses which are blocked by the analyzer 48 result from, among other things, spurious background noise in the electronic equipment associated with the counter, thermal noise in the photomultipliers, light attenuation or quenching in the liquid scintillator and the effect of "Compton Scattering." The latter effect may be readily understood by reference to FIG. 7.

When a decay event occurs in the body 25, a gamma ray is generated which enters the liquid scintillation medium and causes a light scintillation F–1 at some point therein. The gamma ray is deflected at random within the scintillator, producing a plurality of additional light flashes F2–Fx, until either all of the gamma radiation energy is expended or until the ray escapes from the liquid scintillator as represented at point Y. If all of the energy is expended in the scintillation medium, then the total number of light photons generated by the flashes or scintillations F1–Fx is substantially proportional to the gamma ray energy. Since the light energy is converted into electrical pulses by the transducers 32, and the pulses are added in the mixing panel 46 (FIG. 5), the output pulse P–2 will also be substantially proportional to the energy of the gamma decay event and should fall within the band of peak pulses with a high degree of statistical accuracy. Of course, certain of these pulses will be lost (that is, fall within the lower amplitude pulses in the spectrum 51) because of light attenuation or signal loss in the electronic equipment. Additionally, some radiations will escape from the scintillation medium as indicated at Y before giving up all their energy. When this happens, no scintillation will occur, or the light from the resulting scintillation will be so weak that the resulting pulses fall in the lower portion of the spectrum.

It will be apparent from the foregoing, that it is highly desirable to be able to count with $4\pi$ counting geometry. For example, referring to FIG. 7, it will be observed that if only the upper modular unit 26U were employed, all of the light energy represented by light scintiliations F4–Fx would be lost. And, of course, had only the lower module 26L been employed, no light flashes at all would have resulted from the particular decay event illustrated. Consequently, it will be appreciated that loss due to "Compton Scattering" can be minimized by properly designing the module to permit $4\pi$ counting geometry and at the same time maintaining liquid scintillation medium surrounding the counting chamber 12 as "thick" as practical.

Turning to FIG. 8, there are illustrated a plurality of individual spectral curves 51a–51d which are here representative of the signal spectra of output pulses P–1 from a corresponding plurality of individual unbalanced light transducers. As described above, in operation these signals P–1 are electrically added in the mixing panel 46, thus producing a single pulse height spectrum 52 for the pulses P–2. FIG. 8 thus illustrates the fact that unless all of the individual light transducers produce individual pulses having substantially the same spectral distribution, the composite spectrum 52 has no identifiable peak. In other words, the "resolution" is very poor. Such a spectrum does not permit pulse height analysis; qualitative analysis is more difficult if not impossible, and quantative measurements are less accurate. It is for this reason that it is highly desirable to properly balance the several photomultipliers.

Keeping in mind the foregoing considerations, and with particular reference to FIGS. 2–4, it is an important aspect of the present invention to provide apparatus which permits accurate balancing of the different light transducers so that the spectrum of output pulses P–2 from the mixing panel 46 (FIG. 5) is suitable for pulse height analyzing techniques.

In keeping with this aspect of the invention, provision is made for selectively subdividing the liquid-tight chamber 31 in each detector module 26 into discrete compartments so that each light transducer 32 views a body of liquid having essentially the same geometrical size and shape as all other bodies of liquid viewed by the remaining light transducers. As used herein the term "discrete compartments" does not necessarily connote completely separate fluid chambers which are divorced from fluid communication with one another. Rather, the intended connotation of the term "discrete compartments" is simply that the scintillation medium in the chamber 31 is divided into distinct bodies of liquid, which may or may not be in fluid communication with one another, and which are viewed by different ones of the plurality of transducers 32 associated with the particular module.

To achieve this objective, a baffle 54 is pivotally mounted in the module 26 in such a manner that it may selectively be positioned in either a plane parallel to the module end walls 28, or in a plane normal to the opposed end walls and extending therebetween. In the latter position, the baffle 54 serves to subdivide the chamber 31 into two chambers 31a, 31b, each viewed by a different photomultiplier 32. Of course, if three or more photomultipliers 32 were arranged in a single row on the wall 29, it would simply be necessary to position a plurality of like baffles in the module 26. As best illustrated in FIG. 4, the baffle 54 is rigidly mounted on a shaft 55 which extends through an opening in the module wall 29 and passes through an external boss 56 integral with the wall 29. A sealing ring 57 is mounted within the boss 56 so as to maintain the liquid-tight light-tight integrity of the module. A baffle handle 58 is rigidly secured to the shaft 55 for the purpose of selectively rotating the baffle—the handle being oriented in the same plane as is the baffle so as to provide an indication of the baffle position at all times. To urge the baffle inwardly relative to the counter wall 29, a spring 59 is concentrically mounted about the shaft 55 and is bottomed at one end on a radial shoulder 60 formed in the boss 56 and at its opposite end on a collar 61 integral with the shaft. To lock the baffle in a preselected position, a radially disposed indexing pin 62 is mounted in the handle 58 and positioned to be received within one of four equally spaced radial notches 64 formed in the end of the boss 56 (two such notches being visible to FIG. 4).

It will be readily appreciated from the foregoing description and by reference to FIG. 3 that when a standard source 65 is placed at the axis X of the module 26, and assuming that the baffle 54 has been rotated 90° to separate the chamber 31 into compartments 31a, 31b, both photomultipliers 32 will view bodies of liquid having substantially the same geometrical size and shape. Since the standard source 65 is oriented in precisely the same position with respect to both bodies of liquid and both photomultipliers, the latter will both receive substantially the same number of light photons for each decay event of a given energy occurring in the standard source 65. In other words the conditions under which each photomultiplier operates are identical since the distances and geometries of the liquid bodies relative to the source 65 are identical, and the volumes and geometries of the liquid bodies relative to the respective photomultipliers are identical. The effects of light attenuation, "Compton Scatter" and other factors are the same with respect to each photomultiplier, so that the individual pulse height spectra of those photomultipliers will be the same if their "gains" are the same. Of course, it is not necessary to place the standard source 65 on the axis X, but rather the source could be placed at any other position relative to the particular one of the compartments 31a, 31b. However, in this latter instance, it would be necessary to insure that the standard source 65 occupied the same relative reference position with respect to each of the other compartments when the corresponding photomultipliers are being balanced.

In order to independently balance each of the light transducers 32–32" (FIG. 5), provision is made for separately adjusting the transfer function or gain of each light transducer. The "gain" of a photomultiplier is the ratio of the amplitude of a voltage pulse produced to the number of incident light photons causing that pulse. As is well known in the art, the gain of a photomultiplier may be varied by adjusting the magnitude of the high voltage applied to the electrodes therein. In the exemplary apparatus, the balancing operation is accomplished by providing separate gain adjusters 66–66" which take the form of potentiometers 68 (FIG. 5) connected from a point 69 of ground potential to the high voltage supply 42. Each potentiometer 68 provides a selectively variable source of high voltage for the associated photomultiplier, thus permitting adjustment of the signal gain of the associated photomultiplier.

The operator need only take the following steps to accurately balance all of the light transducers 32–32" in the counter 10. Considering the module 26, the operator will shift the baffle 54 to the solid line position (FIG. 5), thus subdividing the chamber 31 into separate compartments 31a and 31b. A standard source 65 of radioactivity (FIG. 3) is then positioned at a reference point with respect to at least one of the pair of photomultipliers 32. The gain of that photomultiplier is then adjusted by varying the potentiometer 68 until a spectral curve 51 (FIG. 6) having an optimum peak is obtained. This procedure is followed with respect to each of the other photomultipliers until all of the spectral curves 51a–51d for the respective photomultipliers are substantially coincident. Thus, there is formed a single pulse spectrum similar to the spectrum 51 (FIG. 6) and characterized by the fact that the pulses form a sharp pronounced peak having good resolution and corresponding to the energy level of the radioactive source. Consequently, pulse height analysis can be readily consumated.

While the exemplary apparatus has been illustrated as employing separate gain adjusters 66–66" coupled to the respective photomultipliers, it will be appreciated that the gain could be adjusted in other ways. Merely by way of example, the gain adjusters 66–66" could, if desired, be incorporated in the high voltage supply 42 to permit adjustment of the transfer function of each photomultiplier from a remote point. Alternatively, the signal gain in each channel could be adjusted by making provision to adjust the gains of the preamplifiers 44a, 44b–44a", 44b".

In addition to their usefulness in balancing the light transducers 32, the movable baffles 54 serve several other functions which greatly increase the versatility and range of applications for the whole body counter 10. Merely by way of example, it will be understood that the internal wall surfaces of the modules 26 are all formed with a finish having a high coefficient of light reflectivity, thus insuring that the maximum number of light photons reach the photomultipliers. Preferably, the baffle 54 also has a light reflective finish. Referring to FIG. 5, and assuming that the baffle 54 (e.g. in module 26) is in the open position represented by the dotted line, it will be appreciated that a scintillation occurring in the chamber 31 will produce a slightly greater output pulse P–1 from the closest photomultiplier 32 and a slightly smaller pulse P–1 from the other photomultiplier 32. These pulses are then electrically added in the manner heretofore described to produce a single pulse P–2 which is passed to the pulse height analyzer 48. If the baffle 54 is now moved to the solid line position, thus subdividing the chamber 31 into compartments 31a, 31b, a similar scintillation will occur in only one of the compartments; e.g., compartment 31a. Only the photomultiplier 32 associated with the compartment 31a will detect the scintillation and produce an output pulse P–1, the baffle 54 serving to block the light from the other photomultiplier. However, in this instance, the pulse P–1 from the one photomultiplier 32 will be greater than it would otherwise have been had the baffle been open, since light will be reflected from the baffle back to the photomultiplier 32. This permits the user to operate the counter 10 with the baffles 54 either open or closed, dependent upon which condition provides the best resolution for the energy spectrum produced by the radioactive material in the body 25.

Moreover, when the user is attempting to analyze pulse spectra caused by radioactive tracers having relatively low energies, the problems presented by background noise are magnified, thus making it difficult to analyze the pulse spectra. When this condition exists, the operator can move the baffle 54 to the open or dotted line position (FIG. 5) and operate the pair of photomultipliers for each module in "coincidence." To this end, a plurality of bi-state devices, here shown as switches S1–S6 are coupled to the pairs of amplifiers 45a, 45b–45a", 45b". For "coincidence" counting it is merely necessary to switch the bi-state devices from one state to the other; i.e., to shift the movable members of the switches S1–S6 from terminals T1 to terminals T2. In this state, the pairs of photomultipliers 32–32" are respectively connected to coincidence circuits 70–70". Such coincidence circuits, which are well known in the prior art, are characterized by their ability to pass a signal only when they receive coincident input signals; i.e., when both photomultipliers in the associated pair detect a light scintillation. Consequently, thermal noise in one photomultiplier or "shot" noise in an amplifier will not produce coincident input signals to the associated coincidence circuit. When coincident input signals are present at any one or more of the circuits 70–70", the latter will pass a corresponding one or more signals to a mixing panel 71 similar to the panel 46 previously described. The output pulses P–2' from the panel 71 are then fed to the pulse height analyzer 48 in a manner identical to that described above in conjunction with panel 46.

While the present invention will find particularly advantageous use in detecting and measuring radioactivity in relatively large bodies such as a whole human body, it will be understod that it can also be used in detecting and measuring the radioactivity in only portions of whole bodies, such for example, as an arm, leg or a portion of the torso. Therefore, the term "whole body counter" as used herein is intended to have the meaning commonly understood by those skilled in the art, i.e., to connote apparatus characterized by its ability to count radiations emanating from relatively large bodies irrespective of whether the entire body or only a portion thereof is inserted into the counting chamber.

I claim as my invention:

1. For use in a modular whole body radiation counter of the type used for counting radioactive emissions from a body disposed along an axis, an enclosed tank-like detector module characterized in that said module is provided with opposed end walls adapted to be disposed normal to the axis and selectively abutted against the corresponding end walls of adjacent modules, a liquid scintillation medium substantially filling said module for producing light flashes upon detection of a radioactive emission, and light transducer means mounted in a single plane parallel to and interposed between said end walls for producing an electrical signal substantially proportional in amplitude to the energy of the corresponding light flashes.

2. For use in a modular whole body radiation counter of the type used for counting gamma radiations emanating from a body disposed along an axis, an enclosed tank-like detector module characterized in that said module is provided with opposed end walls adapted to be disposed normal to the axis and selectively abutted against the corresponding end walls of adjacent modules, a liquid scintillation medium substantially filling said module for producing light flashes upon detection of a gamma radiation, and a plurality of photomultiplier tubes mounted in a single plane parallel to and interposed between said end walls for producing an electrical signal substantially proportional in amplitude to the energy of the corresponding light flashes.

3. For use in a modular whole body radiation counter of the type used for counting radioactive emissions from a body disposed along an axis, an enclosed tank-like detector module characterized in that said module is provided with opposed end walls adapted to be disposed normal to the axis and selectively abutted against the corresponding end walls of adjacent modules, a liquid scintillation medium substantially filling said module for producing light flashes upon detection of a radioactive emission, a plurality of light transducers mounted in a single plane parallel to and interposed between said end walls for producing an electrical signal substantially proportional in amplitude to the energy of the corresponding light flashes, and baffle means mounted in said module for subdividing the latter into discrete compartments each having substantially the same geometrical size and shape and each associated with a different one of said transducers.

4. A modular whole body radiation counter comprising, in combination, a plurality of tank-like modules disposed in end-to-end relation each defining an enclosed chamber with each module having an axial depth $x$ whereby the overall axial length of said counter is a multiple of $x$, a liquid scintillation medium substantially filling each of said chambers, means for supporting a body in parallel proximity to each of said chambers so that each decay event occurring in said body resulting in a gamma emission will produce light flashes in said medium, light transducer means mounted on each of said modules for detecting the light flashes produced therein and for producing an electrical signal substantially proportional in amplitude to the energy of the corresponding light flashes, and means for analyzing the signal spectrum representative of the instantaneous cumulative signals from all of said light transducer means.

5. A modular whole body radiation counter comprising, in combination, a plurality of tank-like modules disposed in face-to-face relation with each module defining an enclosed chamber and with all of said modules definishing a single counting chamber, a liquid scintillation medium substantially filling each of said enclosed chambers, means for supporting a body substantially coincident with the axis of said counting chamber so that each decay event occurring in said body resulting a gamma emission will produce light flashes in said medium, light transducer means associated with each of said modules for detecting the light flashes produced and for producing an electrical signal substantially proportional in amplitude to the energy of the corresponding light flashes, said light transducer means for each module being disposed in a single plane normal to the axis of said counting chamber, and means for analyzing the signal spectrum representative of the cumulative instantaneous signals from all of said light transducer means.

6. A modular whole body radiation counter comprising, in combination, a first plurality of tank-like modules disposed in end-to-end relation and a second plurality of tank-like modules disposed in end-to-end relation with each module defining an enclosed chamber and with each module having an axial depth $x$ whereby the overall axial length of said counter is a multiple of $x$, corresponding modules of said first and second pluralities of modules being disposed in face-to-face relation and defining a single counting chamber, a liquid scintillation medium substantially filling each of said enclosed chambers, means for supporting a body substantially coincident with the axis of said counting chamber so that each decay event occurring in said body and resulting in a gamma emission will produce light flashes in said medium, light transducer means associated with each of said modules for detecting the light flashes produced and for producing an electrical signal substantially proportional in amplitude to the energy of the corresponding light flashes, and means for analyzing the signal spectrum representative of the cumulative instantaneous signals from all of said light transducer means.

7. For use in a modular whole body radiation counter of the type used for counting radioactive emissions from a body disposed along an axis, an enclosed tank-like detector module characterized in that said module is provided with opposed end walls adapted to be disposed normal to the axis and selectively abutted against the corresponding end walls of adjacent modules, a liquid scintillation medium substantially filling said module for producing light flashes upon detection of a radioactive emission, and light transducer means mounted in a single plane parallel to and interposed between said end walls for producing an electrical signal substantially proportional in amplitude to the energy of the corresponding light flashes, the wall of said enclosed tank-like detector module opposite said light transducer means being shaped to define at least a portion of a counting chamber wall.

8. For use in a modular whole body radiation counter of the type used for counting radioactive emissions from a body disposed along an axis, an enclosed tank-like detector module characterized in that said module is provided with opposed end walls adapted to be disposed normal to the axis and selectively abutted against the corresponding end walls of adjacent modules, a liquid scintillation medium substantially filling said module for producing light flashes upon detection of a radioactive emission, light transducer means mounted in a single plane parallel to and interposed between said end walls for producing an electrical signal substantially proportional in amplitude to the energy of the corresponding light flashes, and an expansion chamber mounted on said module and partially filled with said medium for accommodating expansion and contraction of the liquid in said module.

9. For use in a modular whole body radiation counter of the type used for counting radioactive emissions from a body disposed along an axis, an enclosed tank-like detector module characterized in that said module is provided with opposed end walls adapted to be disposed normal to the axis and selectively abutted against the corresponding end walls of adjacent modules, a liquid scintillation medium substantially filling said module for producing light flashes upon detection of a radioactive emission, a plurality of light transducers mounted in a single plane parallel to and interposed between said end walls for producing an electrical signal substantially proportional in amplitude to the energy of the corresponding light flashes, and baffle means mounted in said module for subdividing the latter into discrete compartments each having substantially the same geometrical size and shape and each associated with a different one of said transducers, said baffle means being selectively movable to a position defining discrete compartments and to a position 10. For use in a modular whole body radiation counter of the type used for counting radioactive emissions from a body disposed along an axis, an enclosed tank-like detector module characterized in that said module is provided with opposed end walls adapted to be disposed normal to the axis and selectively abutted against the corresponding end walls of adjacent modules, a liquid scintillation medium substantially filling said module for producing light flashes upon detection of a radioactive emission, a plurality of light transducers mounted in a single plane parallel to and interposed between said end walls for producing an electrical signal substantiallly proportional in amplitude to the energy of the corresponding light flashes, baffle means mounted in said module for subdividing the latter into discrete compartments each having substantially the same geometrical size and shape and each associated with a different one of said transducers, said baffle means being selectively movable to a position defining discrete compartments and to a position defining a single compartment, and means for locking said baffle means in a selected one of said positions.

11. For use in a modular whole body radiation counter of the type used for counting radioactive emissions from a body disposed along an axis, an enclosed tank-like detector module characterized in that said module is provided with opposed end walls adapted to be disposed normal to the axis and selectively abutted against the corresponding end walls of adjacent modules, a liquid scintillation medium substantially filling said module for producing light flashes upon detection of a radioactive emission, a plurality of light transducers mounted in a single plane parallel to and interposed between said end walls for producing an electrical signal substantially proportional in amplitude to the energy of the corresponding light flashes, baffle means mounted in said module for subdividing the latter into discrete compartments each having substantially the same geometrical size and shape and each associated with a different one of said transducers, said baffle means being selectively movable to a position defining discrete compartments and to a position defining a single compartment, and means for indicating the position of said baffle means.

12. A modular whole body radiation counter comprising, in combination, a plurality of tank-like modules disposed in end-to-end relation each defining an enclosed chamber with each module having an axial depth $x$ whereby the overall axial length of said counter is a multiple of $x$, a liquid scintillation medium substantially filling each of said chambers, means for supporting a body in parallel proximity to each of said chambers so that each decay event occurring in said body resulting in a gamma emission will produce light flashes in said medium, a plurality of photomultiplier tubes mounted on each of said modules for detecting the light flashes produced therein and for producing an electrical signal substantially proportional in amplitude to the energy of the corresponding light flashes, the photomultiplier tubes associated with each of said modules being disposed in a single plane normal to the axis of said body supporting means, and means for analyzing the signal spectrum representation of the instantaneous cumulative signals from all of said photomultiplier tubes.

13. A modular whole body radiation counter comprising, in combination, a plurality of tank-like modules disposed in end-to-end relation each defining an enclosed chamber with each module having an axial depth $x$ whereby the overall axial length of said counter is a multiple of $x$, a liquid scintillation medium substantially filling each of said chambers, means for supporting a body in parallel proximity to each of said chambers so that each decay event occurring in said body resulting in a gamma emission will produce light flashes in said medium, a plurality of photomultiplier tubes mounted on each of said modules for detecting the light flashes produced therein and for producing an electrical signal substantially proportional in amplitude to the energy of the corresponding light flashes, the photomultiplier tubes associated with each of said modules being disposed in a single plane normal to the axis of said body supporting means, means for analyzing the signal spectrum representative of the instantaneous cumulative signals from all of said light transducer means, and a plurality of baffles mounted in said modules for subdividing each of the latter into discrete compartments each having substantially the same geometrical size and shape and each associated with a different one of said photomultipliers.

14. A modular whole body radiation counter comprising, in combination, a plurality of tank-like modules disposed in end-to-end relation each defining an enclosed chamber with each module having an axial depth $x$ whereby the overall axial length of said counter is a multiple of $x$, a liquid scintillation medium substantially filling each of said chambers, means for supporting a body in parallel proximity to each of said chambers so that each decay event occurring in said body resulting in a gamma emission will produce light flashes in said medium, a plurality of photomultiplier tubes mounted on each of said modules for detecting the light flashes produced therein and for producing an electrical signal substantially proportional in amplitude to the energy of the corresponding light flashes, the photomultiplier tubes associated with each of said modules being disposed in a single plane normal to the axis of said body supporting means, means for analyzing the signal spectrum representative of the instantaneous cumulative signals from all of said light transducer means, and a plurality of baffles mounted in said modules for subdividing each of the latter into discrete compartments each having substantially the same geometrical size and shape and each associated with a different one of said photomultipliers, said baffles being selectively movable to positions defining discrete compartments in each module and to positions defining a single compartment in each module.

15. A modular whole body radiation counter comprising, in combination, a plurality of tank-like modules disposed in end-to-end relation each defining an enclosed chamber with each module having an axial depth $x$ whereby the overall axial length of said counter is a multiple of $x$, a liquid scintillation medium substantially filling each of said chambers, means for supporting a body in parallel proximity to each of said chambers so that each decay event occurring in said body resulting in a gamma emission will produce light flashes in said medium, a plurality of photomultiplier tubes mounted on each of said modules for detecting the light flashes produced therein and for producing an electrical signal substantially proportional in amplitude to the energy of the corresponding light flashes, the photomultiplier tubes associated with each of said modules being disposed in a single plane normal to the axis of said body supporting means, means for analyzing the signal spectrum representative of the instantaneous cumulative signals from all of said light transducer means, and coincidence circuit means coupled to said photomultiplier tubes for detecting the presence of coincident electrical output signals from all of the photomultiplier tubes associated with any given one of said modules and for passing an output signal to said analyzing means only when coincident signals are detected.

16. A modular whole body radiation counter comprising, in combination, a plurality of tank-like modules disposed in end-to-end relation each defining an enclosed chamber with each module having an axial depth $x$ whereby the overall axial length of said counter is a multiple of $x$, a liquid scintillation medium substantially filling each of said chambers, means for supporting a body in parallel proximity to each of said chambers so that each decay event occurring in said body resulting in a gamma emission will produce light flashes in said medium, light transducer means mounted on each of said modules for detecting the light flashes produced and for producing electrical output signals, a signal totalizer coupled to all of said light transducer means for summing the instantaneous output signals from the latter and for producing single output signals substantially proportional in amplitude to the corresponding light flashes, and means for analyzing the signal spectrum representative of the instantaneous cumulative signals from all of said light transducer means.

17. A modular whole body radiation counter comprising, in combination, a plurality of tank-like modules disposed in face-to-face relation with each module defining an enclosed chamber and with all of said modules defining a single counting chamber having a counting geometry in the range of $2\pi$ to $4\pi$, a liquid scintillation medium substantially filling each of said enclosed chambers, means for supporting a body substantially coincident with the axis of said counting chamber so that each decay event occurring in said body resulting in a gamma emission will produce light flashes in said medium, light transducer means mounted on each of said modules for detecting the light flashes produced and for producing an electrical signal substantially proportional in amplitude to the energy of the corresponding light flashes, said light transducer means for each module being disposed in a single plane normal to the axis of said counting chamber, and means for analyzing the signal spectrum representative of the cumulative instantaneous signals from all of said light transducer means.

18. A modular whole body radiation counter comprising, in combination, a first plurality of tank-like modules disposed in end-to-end relation and a second plurality of tank-like modules disposed in end-to-end relation with each module defining an enclosed chamber and with each module having an axial depth $x$ whereby the overall axial length of said counter is a multiple of $x$, corresponding modules of said first and second pluralities of modules being disposed in face-to-face relation and defining a single counting chamber having a counting geometry in the range of $2\pi$ to $4\pi$, a liquid scintillation medium substantially filling each of said enclosed chambers, means for supporting a body substantially coincident with the axis of said counting chamber so that each decay event occurring in said body and resulting in a gamma emission will produce light flashes in said medium, light transducer means mounted on each of said modules for detecting the light flashes produced and for producing an electrical signal substantially proportional in amplitude to the energy of the corresponding light flashes, and means for analyzing the signal spectrum representative of the cumulative instantaneous signals from all of said light transducer means.

References Cited by the Examiner

UNITED STATES PATENTS

| | | | |
|---|---|---|---|
| 2,739,242 | 3/1956 | Armistead | 250—71.5 |
| 2,917,632 | 12/1959 | Anton | 250—83 X |
| 3,035,172 | 5/1962 | Cowan | 250—71.5 |

OTHER REFERENCES $K^{40}$ Gammas Give Estimate of Lean Meat Content, by Pringle, D. H. and Kulwich, R., from Nucleonics, Feb. 1961, pp. 74, 76 and 78.

RALPH G. NILSON, *Primary Examiner.*

ARCHIE R. BORCHELT, *Examiner.*